Patented Jan. 30, 1940

2,188,883

UNITED STATES PATENT OFFICE 2,188,883

CONDENSATION PRODUCT AND METHOD

Edwin T. Clocker, Fountain Hill, Pa.

No Drawing. Application December 22, 1936,
Serial No. 117,243

22 Claims. (Cl. 260—341)

My invention relates to methods of producing an improved condensation product suitable for use in resins, lacquers, paints, varnishes, enamels, metallic coatings, plastic masses, dispersing, wetting and softening agents, and for other similar purposes, and to the new product so produced. My invention also relates to the new methods of coating, dispersing, and the like. This application is a continuation in part of my copending application, Serial No. 759,086, filed December 24, 1934, for Condensation product and method. Subject matter originally included in this application has been embodied in continuations in part, Serial No. 165,898, filed September 27, 1937, for Condensation product and method; Serial No. 165,899, filed September 27, 1937, for Condensation product and method; and Serial No. 165,900, filed September 27, 1937, for Coating composition and method.

Subject matter at one time included in the present application is now included in several copending applications. Serial No. 165,898, filed Sept. 27, 1937, for Condensation product and method, relates to salts and esters of the condensation product generally and water soluble salts specifically. Serial No. 165,899, filed Sept. 27, 1937, for Condensation product and method, includes the subject matter relating to recondensation. Serial No. 165,900, filed Sept. 27, 1937, for Coating composition and method, is concerned particularly with coating. Serial No. 231,759, filed Sept. 26, 1938, for Condensation product and method, is directed to the reaction product of the condensation product with a basic dyestuff. Serial No. 231,760, filed Sept. 26, 1938, for Condensation product and method, is directed to water insoluble metallic salts. Serial No. 231,761, filed Sept. 26, 1938, for Oily dispersion material, covers oils, fats and waxes emulsified by the condensation product of the invention. Serial No. 235,252, filed October 15, 1938, for Condensation product and method, is directed to condensation with oleic acid and its compounds.

A purpose of my invention is to produce an improved condensation product by causing condensation between one of the first group consisting of maleic acid and its anhydride, compounds which yield the same under the conditions of the reaction, alkyl-substituted maleic acids having less than ten carbon atoms in their carbon chains and maleic esters, and one of the second group consisting of nonconjugated unsaturated nonhydroxylated aliphatic acids having from ten to twenty-four carbon atoms in the carbon chains; nonhydroxylated salts thereof; nonhydroxylated esters thereof or similar compounds.

A further purpose is to cause maleic anhydride or the like to attach to the carbon chain of a nonconjugated unsaturated nonhydroxylated fatty acid or the like by suitable application of heat and, desirably also, pressure. A temperature of between 150° C. and 300° C. is preferred for the reaction, 180° C. to 260° C. being the most satisfactory range. For many purposes the reaction will be performed at a temperature not less than 150° C. and in excess of the ordinary boiling point of the one of the first group with return condensation.

A further purpose is to cause the acid group of a condensation product of maleic anhydride or the like with a nonconjugated unsaturated nonhydroxylated fatty acid or the like having from ten to twenty-four carbon atoms in its carbon chain to react with other compounds, such as metal salts or metals.

A further purpose is to produce oil soluble driers by causing a metal or metal salt to combine with the acid portion of a condensation product produced from maleic anhydride or the like and a nonconjugated unsaturated nonhydroxylated fatty acid or the like having from ten to twenty-four carbon atoms in its carbon chain.

A further purpose is to produce an air-drying or thermo-hardening metal coating which gives improved adherence to metals and other substances by combining maleic anhydride or the like with a nonconjugated unsaturated nonhydroxylated drying oil or the like, so that the effect of the acid in combining with the substance coated is available to produce good adherence.

A further purpose is to improve the mixing of oil with pigment, facilitate grinding of the pigment, secure controlled penetration of the vehicle, and obtain better "leveling" properties in a paint by employing a condensation product of maleic anhydride or the like and a nonconjugated unsaturated nonhydroxylated fatty oil as a vehicle or as an addition to other vehicles.

A further purpose is to "body" the condensation product of maleic anhydride or the like with a drying oil such as linseed oil, for paint and varnish purposes, by blowing and/or heating the condensation product in the presence or absence of a drier.

Further purposes appear in the specification and in the claims.

It has been known for some time that maleic anhydride or substances yielding maleic anhydride will condense with carbon chain compounds containing a conjugated system of double bonds. For example, Morrell, Marks and Samuels in British Patent No. 407,957 disclose a condensation of maleic anhydride with tung oil, a conjugated compound.

I have discovered that, under suitable conditions, maleic anhydride will react with nonconjugated unsaturated nonhydroxylated fatty oils and acids and similar compounds having from ten to twenty-four carbon atoms in the carbon chain to produce a wide variety of products depending upon the characters of the reacting substances and the subsequent reactions to which the condensation products are subjected.

To produce the maleic condensation product, the maleic grouping must be present in condensable form, preferably as maleic anhydride. The condensation is of course obtained from any of the compounds which yield maleic anhydride and the like, such as malic acid, fumaric acid, maleic acid, aconitic acid or citric acid, if subjected to the conditions under whih maleic anhydride is produced. The production of maleic anhydride from such other acids is well known in the art (Bernthsen, Textbook of Organic Chemistry (1923) pages 250-256). Instead of maleic anhydride, an ester of maleic acid, whether an acid or completed ester, or an alkyl substituted maleic acid having less than ten carbon atoms in its carbon chain such as citraconic anhydride may be used. Maleic acid, maleic anhydride, citraconic anhydride, and various other alkyl substituted maleic acids having less than ten carbon atoms in the carbon chain are all acylic mono-olefinic dicarboxylic acids having less than ten carbonic atoms in their carbon chains.

Wherever reference is made herein to maleic anhydride, it will be understood that I include substances which yield maleic anhydride if subjected to the conditions at which maleic anhydride is produced. I also include substituted maleic acids having less than ten carbon atoms in their carbon chains, and other equivalents.

Wherever I refer herein to an acid or to an acid group, I of course include an acid anhydride and an acid anhydride group, and vice versa. Wherever I refer to an ester, I include also a half ester.

Investigation of a large number of compounds has shown that condensation with a nonconjugated unsaturated nonhydroxylated aliphatic acid having from ten to twenty-four carbon atoms in the carbon chain is obtained with maleic anhydride or the like.

It will of course be apparent that an attempt to condense maleic anhydride or the like with a nonconjugated unsaturated hydroxylated aliphatic acid having from ten to twenty-four carbon atoms in the carbon chain, or a salt or ester thereof, will result in esterification between the acidic group of maleic anhydride and the hydroxyl group or groups in the aliphatic acid, salt or ester. Condensation between the maleic anhydride or the like and the carbon chain of the hydroxylated aliphatic acid, salt, or ester, will only take place after esterification is complete, and in case maleic anhydride or the like in excess of that consumed by the esterification is present in contact with the esterified hydroxylated aliphatic acid, salt or ester under the proper conditions.

The esterification of course produces a change in properties, and the condensation product of a hydroxylated aliphatic acid, salt or ester can in general be given properties comparable with those of the condensation product of a nonhydroxylated aliphatic acid, salt, or ester, only by destroying the esterification of the maleic anhydride or the like, as by hydrolysis.

Due to the difficulty in obtaining a condensation reaction between maleic anhydride or the like and a nonconjugated unsaturated hydroxylated aliphatic acid having from ten to twenty-four carbon atoms in the carbon chain, due to the change in properties caused by esterification, and due to the difficulty of decomposing the ester, the claims have generally been drawn to exclude hydroxylated aliphatic acids, salts and esters. This means that such acids, salts and esters are not sufficiently hydroxylated to interfere with the condensation by esterification. Oils which are polymerized by blowing with air are usually hydroxylated.

In those cases where the claims do not exclude hydroxylated aliphatic acids, salts and esters, it will be understood that more than mere esterification is intended—there should be condensation at a point of unsaturation on the carbon chain of the acid, salt or ester.

When reference is made to the maleic grouping in condensable form, it will be understood that it is intended to designate maleic anhydride, a substance yielding maleic anhydride or a maleic ester or similar compound which is capable of condensing to enter the carbon chain of a nonconjugated unsaturated nonhydroxylated aliphatic compound having from ten to twenty-four carbon atoms in the carbon chain. A maleic condensation product may be obtained from any such compound having the maleic grouping, preferably maleic anhydride.

As will be later explained in considerable detail, the presence of the acid or acid anhydride radical in the condensation product is distinctly advantageous, because of the reactions of which the acid or acid anhydride radical is capable and the uses to which such reactions may be put.

A wide variety of nonconjugated unsaturated nonhydroxylated carbon chain compounds having from ten to twenty-four carbon atoms in the carbon chain may be employed. Esters of fatty acids with mono-, di- or poly-hydric alcohols, for example glyceryl or glycol esters, are particularly desirable. The free fatty acids may also be used. Salts of the fatty acids (soaps) may likewise be employed.

When reference is made to the length of the carbon chain as being from ten to twenty-four carbon atoms, it is intended to include compounds having ten carbon atoms, twenty-four carbon atoms or any intermediate number of carbon atoms in the chain. The reference to the length of the carbon chain applies to the carbon chain of the acid. A glyceride, for example, contains three such carbon chains united to a glyceryl group.

As examples of the type of nonconjugated unsaturated nonhydroxylated aliphatic acids having from ten to twenty-four carbon atoms in the carbon chain which I may use, I suggest oleic, linolic, linoleic, clupanodonic and undecylenic. The esters of the nonhydroxylated fatty acids may be either glyceryl esters, which form oils such as corn, olive (triolein), cottonseed, peanut, linseed, sunflower, safflower, perilla, hemp seed, walnut seed, soya bean, rape seed, tomato seed, neat's-foot, lard, codliver, cod, burbet, salmon, menhaden, and many others, all nonconjugated unsaturated nonhydroxylated fatty oils; or esters of other alcohols, for example glycol esters. It will furthermore be understood that mixtures of various esters, or of the esters and the free fatty acids, or of salts of the acids, may be employed if desired.

When I refer to the grouping of a nonconjugated unsaturated nonhydroxylated aliphatic acid having from ten to twenty-four carbon atoms in the carbon chain, I mean to include the acid, and compounds of the acid such as esters of the acid, whether with mono-, di- or polyhydric-alcohols, and salts of the acid. I do not include herein hydroxylated aliphatic acids, oils, etc., because, while the condensation of my invention may in certain cases be obtained with them, special precautions must be taken because of the tendency of hydroxylated fatty acids, oils, etc., to esterify and gel. Typical hydroxylated fatty oils are castor oil and cashew nut shell oil. The question of whether the free acid or the ester or the salt is used is immaterial from the standpoint of the condensation reaction because the condensation reaction with the maleic anhydride appears to involve the carbon chain at an intermediate point between its ends, rather than the carboxyl group or neutralized carboxyl group at the end of the chain. Of course, the character of the product will vary depending upon whether the acid, ester or salt is used.

In the condensation, I may desirably employ one molecular equivalent of nonconjugated unsaturated nonhydroxylated acid or the like to one molecular equivalent of maleic anhydride or the like and subject the mixture to a temperature of between 150° C. and 300° C. (more desirably between 180° C. and 260° C.) and preferably also to high pressure to facilitate the reaction. Pressure may desirably be applied by simply confining the reaction components between the walls of some vessel such as a pressure autoclave and then heating the reaction components. Pressure may also be applied in any other suitable way, as by pumping the reaction components into the vessel or introducing an inert gas under pressure. I have used pressures up to 300 pounds per square inch with success. Of course the desirable pressure will vary with the individual reaction.

A suitable catalyst may be used to accelerate the reaction and to increase the yield. I do not, however, find that a catalyst is necessary.

The condensation reaction may be carried out in the presence of suitable solvents, although this is not usually necessary.

In ordinary practice I prefer not to use sufficient maleic anhydride or the like to saturate all of the double bonds in the fatty acid or fatty oil, etc., having from ten to twenty-four carbon atoms in the carbon chain. The condensation product thus ordinarily has an iodine value. Generally it is sufficient to saturate one-sixth to one-third of the double bonds in the fatty acid, fatty oil, etc. Thus in olive oil one-third of the double bonds (one) is ordinarily saturated, and in linseed oil one-sixth (one). But in individual cases it may be desirable to satisfy more ethylene linkages in the fatty acid or fatty oil, and even to completely saturate them. To saturate all of the ethylene linkages in linseed oil, six molecular equivalents of maleic anhydride or the like are caused to react with one molecular equivalent of linseed oil.

Examples 1 to 4 given below, clearly indicate the way in which my improved condensation product is obtained.

EXAMPLE 1

In a pressure autoclave, 180 parts by weight of raw alkali-refined linseed oil are mixed with 20 parts by weight of maleic anhydride. The temperature is maintained at from 250° C. to 260° C. for one hour, a pressure of about 30 pounds per square inch developing. The reaction may be obtained satisfactorily at 150° C., but is much slower at this low temperature, and the temperature may be raised to as much as 300° C., but a high temperature may cause some difficulty due to carbonization. After cooling, the reaction product is removed from the autoclave. The condensation product is slightly darker and more viscous than the original linseed oil. It is soluble in acetone, ethyl acetate, ether, xylene, carbon tetrachloride, higher petroleum hydrocarbons and turpentine; and semi-soluble in 95% ethyl alcohol. The condensation product is miscible with fatty oils and solutions of nitrocellulose in all proportions. The iodine value is 141.4, as against 190.0 for the original linseed oil. The saponification value is 288 and the acid value is 52.9, in the presence of ethyl alcohol.

EXAMPLE 2

Into a three-neck flask, equipped with a thermometer, mechanical stirrer and reflux condenser, 200 parts by weight of distilled oleic acid and 60 parts by weight of maleic anhydride are placed and heat is applied until the temperature of the mixture reaches 180° C.

The temperature is gradually raised from 180° C. to 250° C. over a period of one hour, during which time the amount of condensed maleic anhydride progressively diminshes. The temperature is maintained at 250° C. to 260° C. until no more maleic anhydride appears to condense. The temperatures given are those found best for carrying out the reaction, although temperatures between 150° C. and 300° C. may be used.

The condensation product is soluble in ethyl alcohol, ether, xylene, carbon tetrachloride and solutions of nitrocellulose, but is substantially insoluble in petroleum hydrocarbons and fatty oils.

EXAMPLE 3

To 180 parts by weight of linseed oil are added 25 parts by weight of citraconic anhydride (a substituted maleic anhydride) and the mixture is heated in a three-neck flask, equipped with a reflux condenser, at about 250° C. for about three-quarters of an hour. At the end of this period, no further citraconic anhydride appears to condense, indicating completion of the reaction. As a precaution, heating is continued for about 15 minutes longer. The reaction product is less viscous than the maleic condensation product of linseed oil obtained in Example 1, but has the same properties otherwise.

EXAMPLE 4

A mixture of 900 parts by weight of linseed oil and 112 parts by weight of acid methyl maleate (a maleic half ester) are heated under pressure at about 250° C. for about two hours. If neutralized with an alkali, the reaction product forms an excellent dispersing agent as later explained.

My novel condensation product may be made with nonconjugated unsaturated nonhydroxylated drying, semidrying or nondrying fatty oils having from ten to twenty-four carbon atoms in the carbon chain, or mixtures of the same, and the characteristics of the product are, to some extent, dependent upon the character of the oils or the like employed in the reaction. In certain of the claims the oil is described by its chemical ingredients as predominantly consisting of glycerides of linoleic and oleic acids. When nonconjugated unsaturated nonhydroxylated drying oils are caused to react with maleic anhydride or the like, the products dry in the air at ordinary temperatures to form hard dry films whether or not driers are used. Likewise, the condensation products of nonconjugated unsaturated nonhydroxylated drying oils generally exhibit thermohardening properties, being convertible at 70° C. to 80° C., for example into hard resistant varnishlike films in short periods of time. Where nonconjugated unsaturated nonhydroxylated semidrying oils such as sunflower, soya, safflower, and other similar oils are caused to react with maleic anhydride or the like, the condensation products do not dry so readily as the condensation products obtained from the drying oils. An example of the drying behavior of the condensation product obtained by Example 1 is as follows:

EXAMPLE 5

A 1:1 xylene solution of the reaction product obtained in Example 1 to which soluble driers are added to the extent of 0.03% of cobalt, 0.05% of manganese and 0.5% of lead, for example in the form of linoleates or resinates, dries to a hard film at room temperature in about five hours and may be stoved to a hard film at 80° C. in about one and one-half hours. The film produced is not acted upon by water, ethyl alcohol, benzine, or xylene.

It is thus evident that the invention permits of the direct production of thermo-hardening and air-drying lacquers, varnishes, etc.

Without limiting myself to any exact structure for the condensation product, it would appear that the condensation product is an addition product at a double bond in the carbon chain of the nonconjugated unsaturated nonhydroxylated fatty acid or the like to the maleic anhydride or the like. For example, if linolenic acid reacts with maleic anhydride, the first stage in the reaction appears to be in general as follows. Of course if enough maleic anhydride be present, the same reaction will take place at each double bond in the linolenic acid.

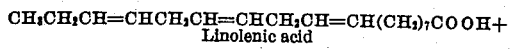

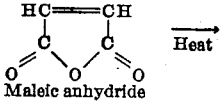

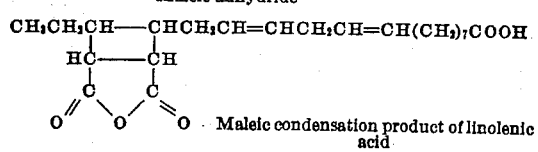

The iodine value of the condensation product confirms the above formula, and indicates that the ethylene linkage of the maleic anhydride or the like has been lost during condensation. It should be noted that one of the double bonds in linolenic acid and the ethylene linkage in maleic anhydride appear to have disappeared in the condensation product forming a ring type compound with four carbon atoms in the ring.

The condensation product appears to be characterized by the linkage:

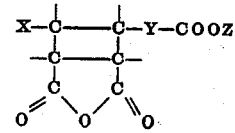

where X and Y are chains of carbon atoms without conjugated double bonds, the length of carbon chain from X to Y, inclusive is between ten and twenty-four carbon atoms, and Z is one of the group consisting of hydrogen, metals and esters.

As a working hypothesis, it would seem that the structural formula which results from the reaction of the present invention may possibly be expressed in more simplified form as

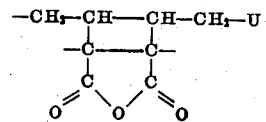

where the straight carbon chain is between ten and twenty-four carbon atoms in length and the terminus U is one of the group consisting of aliphatic acids, salts thereof and esters thereof.

The reaction above will be modified in well known manner if a glyceryl ester of linolenic acid instead of linolenic acid be used, or if some other nonconjugated unsaturated nonhydroxylated aliphatic acid having between ten and twenty-four carbon atoms in the carbon chain be employed.

It should be noted that the maleic anhydride condensation product of linolenic acid or any similar acid has a carboxyl group capable of reacting at the end of the linolenic or other similar carbon chain, and also an olefinic acid group capable of reacting. The condensation will take place notwithstanding that both of these groups have been esterified before the condensation reaction, but the presence of the unesterified polar-reactive groups is of great advantage for many purposes as later explained.

When maleic acid or a substance yielding maleic acid is condensed with a nonconjugated unsaturated nonhydroxylated fatty acid or the like, it appears to change to maleic anhydride and the maleic anhydride condensation product results.

*Recondensation*

The condensation reaction between maleic anhydride or the like and a nonconjugated unsaturated nonhydroxylated aliphatic acid or the like having from ten to twenty-four carbon atoms in its carbon chain has been described in general.

It is possible to recondense the maleic anhydride condensation product of a nonconjugated unsaturated nonhydroxylated aliphatic acid or the like to produce more complex recondensed products. For example, the condensation product of maleic anhydride or the like and a nonconjugated unsaturated nonhydroxylated aliphatic acid or the like having from ten to twenty-four carbon atoms in its carbon chain may be condensed with a phenol, either with or without a condensing agent such as hexamethylenetetramine. Likewise, the maleic condensation may be brought about in the presence of a phenol and aldehyde, with or without a condensing agent such as hexamethylenetetramine. As is well known, phenols and aldehydes themselves possess a tendency to condense, and, when the maleic condensation product of a nonconjugated unsaturated nonhydroxylated aliphatic acid or the like is present, a complex recondensation takes place between the alkyl substituted olefinic condensation product, the phenol and the aldehyde. Recondensation proceeds more satisfactorily when the condensation product contains an acid group.

On the other hand, other reactive resin-forming or resinifying substances may be used to replace part of the maleic condensation product in the recondensation. For example, a mixture of the maleic condensation product of a nonconjugated unsaturated nonhydroxylated aliphatic acid or the like having from ten to twenty-four carbon atoms in its carbon chain with benzoyl benzoic acid (or other reactive resinifying or resin-forming substances) may be condensed with a phenol or a mixture of a phenol and an aldehyde, with or without the assistance of a condensing agent such as hexamethylenetetramine.

The recondensation product obtained by using the maleic condensation product of a nonconjugated unsaturated nonhydroxylated aliphatic acid or the like having from ten to twenty-four carbon atoms in its carbon chain and some other substance or substances capable of undergoing condensation is so complex that even an approximate statement of its structure at the present time is not to be attempted. For the purpose of illustration, however, I give a specific example of a relatively simple recondensation, with knowledge that persons skilled in the art can readily devise other recondensations to suit particular needs.

EXAMPLE 6

In this example 70 parts by weight of the viscous oil obtained by the interaction of maleic anhydride and linseed oil, as described for instance in Example 1, are mixed with 46 parts by weight of a commercially procurable mixture of xylenols (higher phenols) and 14 parts by weight of hexamethylenetetramine. The mixture is slowly heated to 150° C., at which temperature a vigorous reaction begins. After the reaction has subsided, the temperature is raised to 200° C., at which point another reaction starts with rapid increase in viscosity of the reaction product. The temperature is held at 200° C. until the mass becomes almost solid.

The recondensation product is a resinous mass, soluble in xylene, which, in the presence of metallic driers, may be stoved to give a hard film, for example at 80° C. The reaction as described above may be carried out with a great variety of the substances of the types given, and with various quantities and conditions, the change of which is within the skill of a routine experimenter.

*Acid reactions*

As noted above, an acid group of the condensation product is capable of a wide variety of reactions to produce desirable products of various kinds. For example, very satisfactory oil-soluble driers may be manufactured by causing the condensation product of maleic anhydride and a nonconjugated unsaturated nonhydroxylated aliphatic acid or the like having from ten to twenty-four carbon atoms in the carbon chain, particularly a glyceride of such acid, to react with a metallic oxide, hydroxide, carbonate or other similar compound capable of combination with the acid group of the maleic anhydride condensation product. For example, the oxides, hydroxides and carbonates and acetates in the presence of water, and many other salts of lead, cobalt or manganese can be caused to react with the maleic anhydride condensation product of linseed oil prepared as described in Example 1, to form driers which are readily soluble in linseed oil and very useful in the paint, varnish and lacquer industry.

A desirable feature of my invention is that the condensation product of maleic anhydride with nonconjugated unsaturated nonhydroxylated drying oils forms an excellent vehicle or ingredient for a vehicle for paints, etc. This reacts with metallic oxides and hydroxides, and with carbonates and acetates in the presence of water, to form a drier which is chemically combined with the vehicle. Such a drier is made by adding a small percentage of lead oxide to the maleic anhydride condensation product of linseed oil (for example, enought to introduce ½% of lead into the condensation product).

Esterification of the acid group is frequently desirable. The alcohol used may be either aliphatic or aromatic and either mono-, di- or polyhydric. The esterified condensation product in which the maleic grouping has combined with the grouping of a nonconjugated unsaturated nonhydroxylated fatty drying oil exhibits the same desirable air-drying and thermo-hardening properties as the unesterified condensation product, and may be used for paint, varnish and lacquer work with success.

EXAMPLE 7

A typical case of esterification is exhibited when 25 parts by weight of the viscous oil obtained by the interaction of maleic anhydride and linseed oil, as described for instance in Example 1, are mixed with 1.6 parts by weight of ethylene glycol and the mixture is maintained at about 180° C. until the reaction ceases. A 1:1 xylene solution of the reaction product, when treated with a suitable quantity of metallic driers, as described for instance in Example 5, dries at room temperature to a hard film in a somewhat shorter time than that required for linseed oil and, when stoved at 80° C., gives a hard film in about one and one-half hours. The film is not attacked by water, alcohol or xylene.

In the above reaction the ethylene glycol neutralizes the acid anhydride and forms an ester. Of course, if the starting material is the condensation product of linolenic acid instead of its glyceride, esterification takes place at the carboxyl group as well as at the acid anhydride group, as the condensation product is then polar-reactive at two distinct parts of the molecule.

The polar-reactive quality of the acid group in maleic anhydride is of great importance when its condensation product with a nonconjugated unsaturated nonhydroxylated aliphatic acid or the like having from ten to twenty-four carbon atoms in its carbon chain is used as a metal coating. In this instance the acid group acts upon the metal which is coated and produces very tenacious adherence of the film. This makes the maleic anhydride condensation product of a nonconjugated unsaturated nonhydroxylated aliphatic acid or oil or the like having from ten to twenty-four carbon atoms in its carbon chain very desirable as a base or priming coat. The suitability of the maleic anhydride condensation product of a nonconjugated unsaturated nonhydroxylated acid or the like for priming or base coat purposes is increased when nitrocellulose lacquers are employed for a subsequent coat or coats, because nitrocellulose solutions (for example, nitrocellulose dissolved in ethyl alcohol and ethyl acetate) are completely miscible with the maleic anhydride condensation product and firm adherence between the condensation product coat and the nitrocellulose coat or coats is thus obtained. The advantage of the condensation product as a base for nitrocellulose is present whether the olefinic compound be an acid, or an ester, or half ester. It will be understood, however, that the subsequent coats need not be nitrocellulose, but may comprise other paints or lacquers, such as maleic condensation product paints or lacquers, or paints or lacquers based upon drying oils or mixtures of these.

EXAMPLE 8

To 10 parts by weight of the viscous oil obtained by the interaction of linseed oil and maleic anhydride as described for instance in Example 1, soluble driers are added to the extent of about 0.03% cobalt, 0.05% manganese, and 0.5% lead in the form of linoleates or resinates. One half of a polished zinc plate is coated with a 1:1 xylene solution of the product just described and the film is stoved at 80° C. for one and one-half hours.

The film adheres very tenaciously to the metallic surface, and, if the film is removed by boiling acetone, the surface to which the film was attached shows a decided etching effect while the surface of the zinc which was not coated is unaffected. The etching effect appears to be due to the action of the acid anhydride radical in the maleic condensation product of linseed oil on the zinc.

Application of a film of nitrocellulose lacquer to the films of the maleic condensation product of linseed oil results in excellent adherence of the nitrocellulose film to the maleic condensation product film and of the maleic condensation product film to the metal.

The property of firm adherence to metal surfaces is exhibited with all of the ordinary structural and coating metals, such as zinc, tin, lead, copper, iron, aluminium, chromium, nickel, cadmium, etc., and their various alloys, such as steel, michrome, brass, bronze, zinc die-cast metal, etc. The maleic anhydride condensation product of linseed oil dries much more quickly on copper than linseed oil, probably because the copper salt of the condensation product acts as a drier. Adherence to the copper is extremely firm.

My novel condensation product is very satisfactory for use with nitrocellulose solutions in lacquers, etc. The proportions need not be restricted, although I have found that 20% to 50% of nitrocellulose solution and 80% to 50% of condensed drying oil make a suitable vehicle. The polar-reactive groups in the condensed drying oil give firm adherence.

I have observed that the condensation product of maleic anhydride and a nonconjugated unsaturated nonhydroxylated drying oil adheres very firmly to wood and leather, doubtless due to the presence of the polar-reactive group. I therefore recommend this product as an improved paint vehicle, or patent leather coating substance.

An improved varnish or the like may be made by gelling a mixture of natural or synthetic resins and the maleic anhydride or equivalent condensation product of a drying oil, then incorporating the gelled condensation product with a natural or synthetic resin, and dissolving in a solvent. The gelling may be accomplished by heating of the condensation product.

EXAMPLE 9

Gellation is brought about by heating one hundred parts by weight of the condensation product obtained in Example 1 at 305° C. for 45 minutes. To the gelled condensation product, 75 parts by weight of ester gum are added and the mixture is heated until it becomes uniform. After cooling the mixture to 160° C., 175 parts by weight of petroleum spirits, containing drier, are added.

The varnish thus obtained dries to a clear hard film.

Wood rosin, cumar, and "run" copal may be used successfully in place of the ester gum.

The condensation product of the invention is remarkable in its ability to dissolve moderately "run", hard copal, cumar, hard Bakelite and durez, which are not soluble in the ordinary solvents. The condensation product of Example 1 will dissolve many of the curable resins in much more advanced stages of curing than the stages at which said resins are soluble in ordinary linseed oil, for example.

It is possible to manufacture an improved varnish or the like from the maleic anhydride or equivalent condensation product of a drying oil, which is caused to react with glycerine, or other polyhydric alcohol, and the reaction product incorporated with a resin, preferably rosin. This mixture may be heated to the required varnish viscosity and then thinned with common organic solvents.

EXAMPLE 10

Heat together 100 parts by weight of the maleic anhydride condensation product of linseed oil as obtained in Example 1, and 11 parts by weight of glycerine at 230° C. until a drop of the reaction mixture remains clear on cold metal. Then add to the reaction mixture 60 parts by weight of wood rosin and heat at 285° C. for 45 minutes. The product gives an acid number of 25 as compared with 113 for the acid number of the uncondensed mixture.

This product, when cut with petroleum spirits containing drier, dries to a hard, water-resistant film.

Very desirable colored varnishes and lacquers may be obtained by using the condensation product of maleic anhydride or the like and a drying oil, with or without the addition of a synthetic or natural resin, together with a basic dyestuff. The acidic group of the maleic anhydride condensation product appears to combine with the basic group of the dyestuff. The reaction may be brought about directly or in the presence of a suitable solvent.

EXAMPLE 11

A solution of one part by weight of Victoria blue dye base in ten parts by weight of hot toluene is mixed with 100 parts by weight of the maleic anhydride linseed oil condensation product of Example 1. The blue color of the dye is developed by the acid anhydride group of the condensation product. By the addition of driers, the product may be dried to a transparent colored film.

Some of the basic dyestuffs which may be used for example instead of Victoria blue to produce colored lacquers are:

Red
Magenta
Safranine
Rhodamine
Toluidine red

Violet
Crystal violet
Paraphenylene violet

Blue
Methylene blue
Victoria blue (already mentioned)
Night blue
Paraphenylene blue

Yellow
Leather yellow
Chrysoidine

Green
Malachite green
Brilliant green
Azine green

Brown
Bismark brown

A very desirable feature of my invention is the ability to produce dispersing agents for dispersing solids and emulsifying liquids. I have discovered that such a desirable dispersing agent may be obtained by producing a soluble salt, acid salt or salt-ester of the condensation product of maleic anhydride or the like and a nonconjugated unsaturated nonhydroxylated fatty acid or the like having from ten to twenty-four carbon atoms in its carbon chain. For dispersing purposes the salt-ester of the maleic condensation product of a nonconjugated unsaturated nonhydroxylated nondrying fatty oil is preferable.

Experimenting upon the maleic anhydride condensation product of a nonconjugated unsaturated nonhydroxylated fatty oil having from ten to twenty-four carbon atoms in its carbon chain, I have found that the completed salt, in which the maleic grouping is combined with carboxyl groups neutralized by an alkali metal base, for instance potassium or sodium hydroxide, or an organic base such as triethylamine, is a satisfactory dispersing agent. The acid salt, in which one carboxyl group is not neutralized and another is neutralized by an alkali metal base or organic base, is likewise a satisfactory dispersing agent. Also, the salt-ester is satisfactory. The completed ester is not a good dispersing agent.

When reference is made in the claims to salts in the present connection, it is intended to include completed salts, acid salts and salt-esters. The base used in forming the soluble salt may be an alkali metal base or an organic base.

In producing my desirable dispersing agent, I preferably esterify the maleic condensation product with the theoretical quantity of an aliphatic or aromatic alcohol to produce an acid ester and then neutralize the acid ester with a suitable base or alkali to form a soluble salt-ester. The resultant product is a water-soluble oil which may be mixed with other oils to produce an emulsion. Emulsions made in this way have been found to be very stable and very neutral. Such oil emulsions may be used to advantage instead of sulphonated oil emulsions because the stability, wettability, solubility and dispersive power of the dispersing agent obtained by my invention is greater than in the case of sulphonated oils. Emulsions produced by my dispersing agents have the further advantage over sulphonated oil emulsions that they are not decomposed, and particularly do not liberate an acid group as do the sulphonated oils, which liberate sulphuric acid upon decomposition.

Large quantities of sulphonated oils are now used for dispersing, wetting and softening agents in the textile, leather, paper, plaster and cement industries. My improved product is according to tests by me superior to the commonly used sulphonated oils for use as a dispersing, wetting and softening agent in these and other industries. In the textile field, my product may be used in delustering rayon, for example.

Using my novel dispersing agents, I have produced very satisfactory dispersions of carnauba wax in water, of petroleum hydrocarbons in water and of many vegetable oils, such as linseed, olive, neat's foot, castor, etc., in water.

My new dispersing agent is very desirable as a bodying agent in the making of polishes, cutting fluids and cosmetics. There are of course many other uses too numerous to mention.

EXAMPLE 12

To 50 parts by weight of the viscous oil obtained by the interaction of maleic anhydride and olive oil under conditions similar to those described for instance in Example 1 (1 molecular equivalent of maleic anhydride to 1 molecular equivalent of olive oil), are added 5 parts by weight of isoamyl alcohol and the ingredients are refluxed for one-half hour. Any suitable alcohol may be used for this esterification, although the quantity of alcohol used will of course depend upon the particular alcohol. The reaction produces an acid ester.

The product is neutralized with the theoretical amount of a base, preferably sodium or potassium hydroxide in concentrated aqueous solution. The resultant oily product is miscible with water in all proportions and is likewise miscible in all proportions with fatty oils and petroleum hydrocarbons.

The neutralized acid ester as prepared above may be added to any suitable fatty oil or petroleum hydrocarbon to produce dispersion.

The acid ester may be added to the disperse phase before neutralization, and neutralization may be accomplished in the presence of the disperse phase.

EXAMPLE 13

To a water-insoluble hydrocarbon, alcohol, or fatty oil, such as olive oil, castor oil, etc., or wax such as carnauba or candelilla, the soluble salt-ester of a nonconjugated unsaturated nonhydroxylated fatty oil condensation product as prepared in Example 12 is added until the ester forms 20% of the mixture. This mixture is readily emulsified with water due to the presence of the water-soluble neutralized acid ester, and will remain in suspension over an indefinitely long period of time. Such dispersions having a minimum quantity of dispersing agent have remained in suspension and shown no tendency to cream after a year's standing.

If the water-soluble oil as obtained in Example 13 is boiled with water for one to five hours, the product is not decomposed with the concomitant separation of oil.

The emulsion of olive oil dispersed by the water-soluble oil as obtained in Example 13 is very satisfactory as a wetting and softening agent for the textile, leather, and paper industries.

An ester of the condensation product may be hydrolyzed or partially hydrolyzed and then neutralized to produce a dispersing agent.

Paint

There are a number of properties of the condensation product of maleic anhydride or the like with a drying oil such as linseed oil which specially suit this condensation product for use as a paint vehicle.

*Hardness.*—When the condensation product as obtained in Example 1 dries in a film, the film has been found to have a hardness greater than the film produced under similar conditions using raw linseed oil. A small amount, for instance 1% to 3%, of the condensation product obtained in Example 1, added to the raw linseed oil, greatly increases the resistance of the resultant film to accelerated weathering tests. The paint whose vehicle contains 3% of the condensation product above referred to shows less pitting and chipping than a paint which is exactly similar except for the absence of the condensation product.

*Water resistance.*—A thoroughly dried film of the condensation product obtained in Example 1 has been found to have a far superior resistance both to cold and boiling water than a similar film of the drying oil from which the condensation product was made, for instance linseed oil.

If a dry film of raw linseed oil is placed in distilled water at room temperature, a foggy appearance develops on the surface within about forty-eight hours. A dry film of the condensation product exposed to distilled water under similar conditions shows no fogging after one week of exposure.

When subjected to boiling water, the dry film of raw linseed oil applied to a glass plate comes off within a few seconds while the dry film of the condensation product of Example 1 applied to glass under similar conditions resists for about two minutes before it peels off.

*Wettability.*—The mixing of pigment with vehicle can be greatly facilitated by virtue of the superior wettability of the condensation product of the present invention for pigment. The condensation product obtained in Example 1, for instance, has a preferential adhesion to pigment. This may be employed by mixing a small quantity (say 1% or 3% based on the total weight of vehicle), of the condensation product of Example 1 with the pigment and then adding the remainder of the vehicle which may simply be raw linseed oil. The initial addition of the condensation product coats the pigment and when the raw linseed oil is subsequently added the mixing with the raw linseed oil is very readily accomplished. Superior mixing is also obtained even though the condensation product and the raw linseed oil are mixed together before being incorporated with the pigment. The time required for mixing with a pigment, such as zinc oxide, is very much reduced. It is much easier to grind the pigment with the vehicle if a few percent of the condensation product of the present invention are included in the vehicle or preferably are added to the pigment before mixing with the main body of the vehicle.

*Settling.*—The condensation product of the present invention increases the permanence of suspension of pigment in a vehicle. As little as 3% of the condensation product of Example 1 incorporated in an ordinary linseed oil vehicle gave the following improvements in settling:

| Pigment | Using 3% condensation product of Example 1 and 97% raw linseed oil in vehicle | Using 100% raw linseed oil in vehicle |
| --- | --- | --- |
| White lead | 6 | 9+ |
| Zinc oxide | 3+ | 9+ |
| Titanox | 1 | 1+ |
| Lithopone | 1 | 1+ |

In the above scale 1 indicates no settling and 10 indicates maximum settling. With white lead pigment, the settling tendency was improved by 3% of the condensation product from 9+ to 6, while with zinc oxide the improvement was from 9+ to 3+. Even in lithopone and titanox paints, which have very little tendency to settle, an improvement was noted. The decrease in settling tendency, due to the condensation product as obtained in Example 1, or other condensation product of the present invention, constitutes a marked improvement from the standpoint of packaging paint and also in obtaining an even mixing of the paint by the user after opening the can.

*Superpigmented paint.*—A very beneficial effect of the condensation product is that it makes possible exceptional increases in the pigment contents of paints. Whereas ordinary commercial paint commonly has a pigment content of about 28% to 30%, it is possible to obtain a pigment content of 40% without difficulty, by using the condensation product of the present invention (Example 1 for instance) as the vehicle or as an ingredient of the vehicle. A very desirable vehicle for such superpigmented paints may contain 15% of the condensation product of Example 1 with the remainder raw linseed oil. Such superpigmented paint may be applied with a brush with the usual quantity of thinner and flows without difficulty. The superpigmented paints produced as just explained have film strengths two to three times the film strengths of paints which have the ordinary quantities of pigments. The superpigmented paints are also markedly less responsive to ultra violet light. The films of such superpigmented paints are denser and of increased hiding power. Superpigmenting is advantageous in printing inks as well as in paints.

*Leveling.*—The paint produced by the use of the condensation product of the present invention as the vehicle or as an ingredient of the vehicle (for example 3% of the vehicle) has superior leveling properties. These are so marked that where two paints are compared in use, identical except that one contains 3% of the condensation product of Example 1, it might be supposed by uninformed persons that the paint containing the condensation product was really enamel rather than paint because of the great smoothness and the removal of brush marks caused by the condensation product. The leveling property would appear to be due to the dispersing action of the condensation product. The surfaces exhibiting superior leveling have increased wearing properties by virtue of this fact.

*Controlled penetration.*—The condensation product of maleic anhydride or the like with a drying oil as made for instance in Example 1 has controlled penetration properties. Expressed in other words, when a film containing said condensation product is painted in the ordinary manner as the priming coat on wood or other permeable material, the vehicle will not leave the pigment but will penetrate only a few cells deep into the wood. In the ordinary paint using raw linseed oil alone as a vehicle, the vehicle will penetrate far into the wood leaving the pigment at the surface with a depleted vehicle content or without any vehicle. This is a frequent cause of failure of paint films. The reason for the controlled penetration of the condensation product of the present invention would appear to be preferential adhesion to the pigment. The conventional test for controlled penetration is painting an unglazed blotter and observing whether the paint penetrates to the other side. In case the condensation product of the present invention is used as the vehicle, it is found that the vehicle remains with the pigment on the side painted, while linseed oil will leave the pigment and soak into the blotter, being observable on the other side. This feature has contributed to the successful test of the condensation product of the present invention as a priming coat.

It will immediately be evident to persons familiar with the art that the disclosure of the present invention is of wide utility in a number of diversified industries, as it provides a means of altering the properties of any one of a wide variety of commercially used oils to fit them to several new needs. For example, it is possible to obtain greatly increased viscosity.

A very desirable property of the condensation product of maleic anhydride or the like with drying oils is that the viscosity is only slightly increased by virtue of the condensation. It is, however, possible to "body" the condensation product of maleic anhydride or the like with a drying oil such as linseed oil, either by blowing or heating or both, either in the presence of a drier or without a drier. Such bodied condensation product may be used in the paint, lacquer and varnish industry, and for related purposes.

EXAMPLE 14

Heat 100 parts by weight of the condensation product of maleic anhydride and linseed oil as obtained in Example 1 to 305° C. and maintain it at this temperature with constant stirring until the viscosity reaches the desired value. The viscosity of the condensation product increases very rapidly at this temperature, and any required viscosity short of the gel stages may be obtained. The reaction period is generally less than one hour.

The condensation product obtained as above may be heated until a one-half inch string pours from cold metal. This condensation product is then cut with an equal weight of raw linseed oil. Seven parts by weight of the mixture is added to a paint containing 225 parts by weight of white lead paste, 40 parts by weight of raw linseed oil and 7 parts by weight of thinner plus drier. The final composition of the paint is 28% pigment by volume, with the vehicle containing 10% thinner by weight. This paint shows greatly improved viscosity, markedly superior pigment suspension and greatly improved levelling properties.

The maleic anhydride condensation product of linseed oil obtained in Example 1 may be blown at 105° C. to produce the same viscosity as that described in Example 14 above, and the blown condensation product may be used in the same general way. The blown-bodied condensation products are superior in color to the heat-bodied condensation products of the present invention.

I can increase the wettability of oils to pigments, with consequent improvement in the mixing, grinding and "leveling" properties. It is also possible to increase tremendously the property of a film of firm adherence to metal and of firm adherence to special lacquer films which are subsequently applied. It is also possible to render the product soluble in water and to produce stable dispersions.

I believe that I am the first to discover that maleic anhydride or the like will condense with the carbon chain of a nonconjugated unsaturated nonhydroxylated aliphatic acid, nonhydroxylated ester, nonhydroxylated salt, etc. having from ten to twenty-four carbon atoms in the carbon chain. I frequently refer to such nonconjugated unsaturated nonhydroxylated aliphatic acids, nonhydroxylated esters, nonhydroxylated salts, etc., as nonconjugated unsaturated nonhydroxylated fatty acid compounds, or compounds having the fatty acid grouping. For different compounds, some variations in desirable reaction temperatures and pressures will be found.

Wherever I refer herein to resin-forming substances I mean to include resinifying substances also, and when I refer to resinifying substances, I likewise mean to include resin-forming substances.

Throughout the specification and claims, where I refer to nonconjugated unsaturated nonhydroxylated aliphatic acids having from ten to twenty-four carbon atoms in the carbon chain, or nonhydroxylated salts or nonhydroxylated esters thereof, I mean such acids, salts or esters as are unoxidized or nonpolymerized or not sufficiently oxidized or polymerized to interfere with the reactions disclosed herein. Thus, in referring to linseed oil, I mean the product generally known as such, raw or refined, and not linseed oil sufficiently oxidized or polymerized to prevent or seriously interfere with the formation of a condensation product at a double bond. In other words, I do not intend to exclude others from mere esterification of oxidized or polymerized fatty oils by maleic anhydride.

Many of the fish oils contain varying percentages of fatty alcohols, which will of course react with maleic anhydride to form esters. The esterified fatty alcohols may be allowed to remain in the condensation product, or the alcohols may be removed before condensation takes place.

It will be evident that the condensation product of my invention may be oxidized subsequent to condensation.

Where reference is made to poly-hydric alcohols, it is intended to include di-hydric alcohols. Reference to acids is intended to include acid anhydrides and half esters of acids. Reference to esters is intended to include partially completed esters such as half esters.

In view of my invention and disclosure variations and modifications to meet individual whim or particular need will doubtless become evident to others skilled in the art, to obtain all or part of the benefits of my invention without copying the exact process or product described, and I, therefore, claim all such in so far as they fall within the reasonable spirit and scope of my invention.

Having thus described my invention, what I claim as new and desire to secure by Letters Patent is:

1. The process of forming a condensation product, which comprises reacting one of the first group consisting of maleic acid and its anhydride, compounds which yield the same under the conditions of the reaction, alkyl-substituted maleic acids having less than ten carbon atoms in their carbon chains and maleic esters, at a double bond in the carbon chain of one of the second group consisting of nonconjugated unsaturated nonhydroxylated aliphatic acids having from ten to twenty-four carbon atoms in their carbon chains, nonhydroxylated salts and nonhydroxylated esters thereof, at a temperature in excess of 150° C., the reaction being wholly between the one of the first group and the one of the second group and continuing the heating until a substantial quantity of the one of the first group is combined at an intermediate point in the carbon chain in the one of the second group.

2. The process of forming a condensation product, which comprises reacting one of the first group consisting of maleic acid and its anhydride, compounds which yield the same under the conditions of the reaction, alkyl-substituted maleic acids having less than ten carbon atoms in their carbon chains and maleic esters, at a double bond in the carbon chain of one of the second group consisting of nonconjugated unsaturated nonhydroxylated aliphatic acids having from ten to twenty-four carbon atoms in their carbon chains, nonhydroxylated salts and nonhydroxylated esters thereof, at a temperature not less than 150° C. and in excess of the ordinary boiling point of the one of the first group with return condensation and for a time sufficient to produce a substantial amount of the condensation product, the reaction being wholly between the one of the first group and the one of the second group.

3. The process of forming a condensation product, which comprises reacting one of the group consisting of maleic acid and its anhydride, compounds which yield the same under the conditions of the reaction, alkyl-substituted maleic acids having less than ten carbon atoms in their carbon chains and maleic esters, with an unsaturated linkage of an oil predominantly consisting of glycerides of linoleic and oleic acids at a temperature in excess of 150° C. and continuing the heating until a substantial quantity of the one of the group is combined at an intermediate point in the carbon chain of the fatty acid of the oil, the reaction being wholly between the one of the group and the oil.

4. The process of forming a condensation product, which comprises reacting one of the group consisting of maleic acid and its anhydride, compounds which yield the same under the conditions of the reaction, alkyl-substituted maleic acids having less than ten carbon atoms in their carbon chains and maleic esters, with an unsaturated linkage of an oil predominantly consisting of glycerides of linoleic and oleic acids at a temperature not less than 150° C. and in excess of the ordinary boiling point of the one of the group with return condensation and for a time sufficient to produce a substantial amount of the condensation product, the reaction being wholly between the one of the group and the oil.

5. The process of forming a condensation product, which comprises heating a mixture of one of the first group consisting of maleic acid and its anhydride, compounds which yield the same under the conditions of the reaction, alkyl-substituted maleic acids having less than ten carbon atoms in their carbon chains and maleic esters, with one of the second group consisting of nonconjugated unsaturated nonhydroxylated aliphatic acids having from ten to twenty-four carbon atoms in their carbon chains, nonhydroxylated salts and nonhydroxylated esters thereof, to a temperature between 150° C and 300° C., the reaction being wholly between the one of the first group and the one of the second group, and continuing the heating until a substantial quantity of the one of the first group is combined at an intermediate point in the carbon chain in the one of the second group and in the presence of no substantial excess of the one of the first group over the quantity necessary to saturate all double bonds in the one of the second group.

6. The process of forming a condensation product, which comprises reacting one of the first group consisting of maleic acid and its anhydride, compounds which yield the same under the conditions of the reaction, alkyl-substituted maleic acids having less than ten carbon atoms in their carbon chains and maleic esters, at a point of unsaturation in the carbon chain of one of the second group consisting of nonconjugated unsaturated nonhydroxylated aliphatic acids having from ten to twenty-four carbon atoms in their carbon chains, nonhydroxylated salts and nonhydroxylated esters thereof, at a temperature not less than 150° C. and in excess of the ordinary boiling point of the one of the first group with return condensation and for a time sufficient to produce a substantial amount of the condensation product and in proportions which saturate less than all of the double bonds in said one of the second group, the reaction being wholly between the one of the first group and the one of the second group.

7. The process of forming a condensation product, which comprises reacting one of the first group consisting of maleic acid and its anhydride, compounds which yield the same under the conditions of the reaction, alkyl-substituted maleic acids having less than ten carbon atoms in their carbon chains and maleic esters, with one of the second group consisting of nonconjugated unsaturated nonhydroxylated aliphatic acids having from ten to twenty-four carbon atoms in their carbon chains, nonhydroxylated salts and nonhydroxylated esters thereof, at a temperature between 150° C. and 300° C., the reaction being wholly between the one of the first group and the one of the second group and continuing the heating until a substantial quantity of the one of the first group is combined at an intermediate point in the carbon chain in the one of the second group and in proportions of about one molecular equivalent of the one of the first group to one molecular equivalent of the one of the second group.

8. The process of forming a condensation product, which comprises reacting one of the first group consisting of maleic acid and its anhydride, compounds which yield the same under the conditions of the reaction, alkyl-substituted maleic acids having less than ten carbon atoms in their carbon chains and maleic esters, with one of the second group consisting of nonconjugated unsaturated nonhydroxylated aliphatic acids having from ten to twenty-four carbon atoms in their carbon chain, nonhydroxylated salts and nonhydroxylated esters thereof, at a temperature not less than 150° C. and in excess of the ordinary boiling point of the one of the first group with return condensation and for a time sufficient to produce a substantial amount of the condensation product and in proportions of about one molecular equivalent of the one of the first group to one molecular equivalent of the one of the second group, the reaction being wholly between the one of the first group and the one of the second group.

9. The process of making a condensation product, which comprises applying heat and pressure above atmospheric to a mixture of one of the first group consisting of maleic acid and its anhydride, compounds which yield the same under the conditions of the reaction, alkyl-substituted maleic acids having less than ten carbon atoms in their carbon chains and maleic esters, with one of the second group consisting of nonconjugated unsaturated nonhydroxylated aliphatic acids having from ten to twenty-four carbon atoms in their carbon chains, nonhydroxylated salts and nonhydroxylated esters thereof, at a temperature between 150° C. and 300° C., and continuing the heating until a substantial quantity of the one of the first group is combined at an intermediate point in the carbon chain in the one of the second group and in the presence of no substantial excess of the one of the first group over the quantity necessary to saturate all double bonds in the one of the second group, the reaction being wholly between the one of the first group and the one of the second group.

10. The process of forming a condensation product, which comprises reacting maleic anhydride at a point of unsaturation in the carbon chain of a drying oil predominantly consisting of glycerides of linoleic and oleic acids at a temperature between 150° C. and 300° C., the reaction being wholly between the maleic anhydride and the oil and continuing the heating until a substantial quantity of the maleic anhydride is combined at an intermediate point in the carbon chain of the fatty acid of the oil.

11. The process of forming a condensation product, which comprises reacting maleic anhydride at a point of unsaturation in the carbon chain of a drying oil predominantly consisting of glycerides of linoleic and oleic acids at a temperature in excess of the ordinary boiling point of maleic anhydride with return condensation and for a time sufficient to produce a substantial amount of the condensation product, the reaction being wholly between the maleic anhydride and the oil.

12. The process of producing a drying oil of increased utility for the paint, varnish and lacquer industry and the like, which comprises reacting one of the group consisting of maleic acid and its anhydride, compounds which yield the same under the conditions of the reaction, alkyl-substituted maleic acids having less than ten carbon atoms in their carbon chains and maleic esters, with a nonconjugated unsaturated nonhydroxylated drying oil having from ten to twenty-four carbon atoms in the carbon chain at a temperature in excess of 150° C., the reaction being wholly between the one of the group and the oil and continuing the heating until a substantial quantity of the one of the group is combined at an intermediate point in the carbon chain of the fatty acid of the oil, and bodying the condensation product by blowing.

13. The process of producing a drying oil of increased utility for the paint, varnish and lacquer industry and the like, which comprises reacting one of the group consisting of maleic acid and its anhydride, compounds which yield the same under the conditions of the reaction, alkyl-substituted maleic acids having less than ten carbon atoms in their carbon chains and maleic esters, with a nonconjugated unsaturated nonhydroxylated drying oil having from ten to twenty-four carbon atoms in the carbon chain at a temperature in excess of 150° C., the reaction being wholly between the one of the group and the oil and continuing the heating until a substantial quantity of the one of the first group is combined at an intermediate point in the carbon chain in the one of the second group and bodying the condensation product by heating.

14. The process of forming a condensation product, which comprises reacting maleic anhydride with linseed oil at a temperature not less than 150° C. and in excess of the ordinary boiling point of the maleic anhydride with return condensation and for a time sufficient to produce a substantial amount of the condensation product, the reaction being wholly between the maleic anhydride and the oil.

15. A condensation product comprising one of the first group consisting of maleic acid and its anhydride, compounds which yield the same under the conditions of the reaction, alkyl-substituted maleic acids having less than ten carbon atoms in their carbon chains and maleic esters, combined at an unsaturated linkage with one of the second group consisting of nonconjugated unsaturated nonhydroxylated aliphatic acids having from ten to twenty-four carbon atoms in their carbon chains, nonhydroxylated salts and nonhydroxylated esters thereof, by heating at a temperature in excess of 150° C. and continuing the heating until a substantial quantity of the one of the first group is combined at an intermediate point in the carbon chain in the one of the second group, the quantity of said one of the first group being not substantially in excess of that required to saturate said one of the second group and the reaction being wholly between the one of the first group and the one of the second group.

16. A condensation product comprising one of the first group consisting of maleic acid and its anhydride, compounds which yield the same under the conditions of the reaction, alkyl-substituted maleic acids having less than ten carbon atoms in their carbon chains and maleic esters, combined at an unsaturated linkage with one of the second group consisting of nonconjugated unsaturated nonhydroxylated aliphatic acids having from ten to twenty-four carbon atoms in their carbon chains, nonhydroxylated salts and nonhydroxylated esters thereof, by heating at a temperature in excess of 150° C. and continuing the heating until a substantial quantity of the one of the first group is combined at an intermediate point in the carbon chain in the one of the second group, and in the proportions of one molecular equivalent of the one of said first group to one molecular equivalent of said one of the second group, the reaction being wholly between the one of the first group and the one of the second group.

17. A condensation product comprising one of the first group consisting of maleic acid and its anhydride, compounds which yield the same under the conditions of the reaction, alkyl-substituted maleic acids having less than ten carbon atoms in their carbon chains and maleic esters, combined at an unsaturated linkage with one of the second group consisting of nonconjugated unsaturated nonhydroxylated aliphatic acids having from ten to twenty-four carbon atoms in their carbon chains, nonhydroxylated salts and nonhydroxylated esters thereof, by heating at a temperature between 150° C. and 300° C., the reaction being wholly between the one of the first group and the one of the second group, and continuing the heating until a substantial quantity of the one of the first group is combined at an intermediate point in the carbon chain in the one of the second group and in proportions which substantially completely saturate the double bonds in said nonconjugated unsaturated aliphatic compound without substantial excess.

18. A condensation product comprising the product of reaction of one of the group consisting of maleic acid and its anhydride, compounds which yield the same under the conditions of the reaction, alkyl-substituted maleic acids having less than ten carbon atoms in their carbon chains and maleic esters, at a point of unsaturation of the carbon chain of an oil predominantly consisting of glycerides of linoleic and oleic acids, at a temperature between 150° C. and 300° C., the reaction being wholly between the one of the group and the oil, and continuing the heating until a substantial quantity of the one of the group is combined at an intermediate point in the carbon chain of the fatty acid of the oil.

19. In a paint vehicle, a liquid condensation product of one of the group consisting of maleic acid and its anhydride, compounds which yield the same under the conditions of the reaction, alkyl-substituted maleic acids having less than ten carbon atoms in their carbon chains and maleic esters, at a point of unsaturation of the carbon chain of a drying oil predominantly consisting of glycerides of linoleic and oleic acids, at a temperature of between 150° C. and 300° C., the reaction being wholly between the one of the group and the oil and continuing the heating until a substantial quantity of the one of the group is combined at an intermediate point in the carbon chain of the fatty acid of the oil.

20. A condensation product of a drying oil predominantly consisting of glycerides of linoleic and oleic acids combined at a double bond with one of the group consisting of maleic acid and its anhydride, compounds which yield the same under the conditions of the reaction, alkyl-substituted maleic acids having less than ten carbon atoms in their carbon chains and maleic esters, by heating at a temperature in excess of 150° C., the reaction being wholly between the one of the group and the oil, and continuing the heating until a substantial quantity of the one of the group is combined at an intermediate point in the carbon chain of the fatty acid of the oil and in the proportions of not substantially more than enough of the one of the group to saturate the oil.

21. A reaction product of maleic anhydride combined with linseed oil by heating at a temperature not less than 150° C. and in excess of the ordinary boiling point of the maleic anhydride with return condensation and for a time sufficient to produce a substantial amount of the condensation product, the condensation taking place at a point of unsaturation in the oil, and in proportions of not substantially more than enough of the maleic anhydride to saturate the oil, the reaction being wholly between the maleic anhydride and the oil.

22. A condensation product comprising the product of reaction at a double bond in the oil of maleic anhydride and linseed oil in proportions of not substantially more than enough of the maleic anhydride to saturate the oil.

EDWIN T. CLOCKER.